US008910823B2

(12) United States Patent
Mesman

(10) Patent No.: US 8,910,823 B2
(45) Date of Patent: Dec. 16, 2014

(54) READY-MADE MEAL PACKAGE

(75) Inventor: Joel L. Mesman, Rogers, MN (US)

(73) Assignee: Target Brands, Inc., Minneapolis, MN (US)

( * ) Notice: Subject to any disclaimer, the term of this patent is extended or adjusted under 35 U.S.C. 154(b) by 1029 days.

(21) Appl. No.: 12/687,399

(22) Filed: Jan. 14, 2010

(65) Prior Publication Data

US 2011/0168720 A1 Jul. 14, 2011

(51) Int. Cl.
*B65D 25/04* (2006.01)
*B65D 33/02* (2006.01)

(52) U.S. Cl.
CPC ..................................... *B65D 33/02* (2013.01)
USPC ..................................... 220/529; 229/120.38

(58) Field of Classification Search
USPC .......... 206/433, 192, 193; 220/507, 510, 527, 220/528, 529, 552, 520, 523; 383/40; 229/120.38, 120.02, 120.06, 120.23, 229/120.24, 120.36, 120.37, 120.29, 229/120.03, 120.04, 120.05, 120.12, 120.19
See application file for complete search history.

(56) References Cited

U.S. PATENT DOCUMENTS

| | | | | |
|---|---|---|---|---|
| 1,251,404 A | * | 12/1917 | Mills | ............................. 150/100 |
| 1,479,328 A | * | 1/1924 | Sinel | .......................... 229/103.2 |
| 1,770,701 A | * | 7/1930 | Kelly | ....................... 229/120.18 |
| 1,983,418 A | | 12/1934 | Thurmer | |
| 2,112,406 A | | 3/1938 | Metro | |
| 2,517,767 A | | 8/1950 | Cody | |
| 3,201,022 A | * | 8/1965 | Glassco et al. | ........... 229/120.24 |
| 3,327,924 A | | 6/1967 | Brutting | |
| 3,497,057 A | * | 2/1970 | Traner et al. | ................... 206/730 |
| 4,114,760 A | * | 9/1978 | Entenmann | ..................... 206/562 |
| 4,376,507 A | * | 3/1983 | Nauheimer | ............... 229/120.24 |
| 4,381,057 A | * | 4/1983 | Carver | ........................... 206/434 |
| 4,579,220 A | * | 4/1986 | Brundage | .................. 206/45.25 |
| 4,708,248 A | | 11/1987 | Davis | |
| 4,779,720 A | * | 10/1988 | Mandelbaum | ................ 206/756 |
| 4,819,793 A | | 4/1989 | Willard et al. | |
| 4,852,739 A | | 8/1989 | Franco | |
| 4,869,599 A | | 9/1989 | Allen | |
| 4,883,675 A | | 11/1989 | Wernz | |
| 4,955,502 A | * | 9/1990 | Sorci | ......................... 229/120.24 |
| 5,020,921 A | | 6/1991 | Beales | |
| 5,071,007 A | * | 12/1991 | Kadien | .......................... 206/429 |
| 5,464,150 A | | 11/1995 | Porres Sanchez et al. | |
| 5,474,204 A | * | 12/1995 | Sutyla | ........................... 220/507 |
| 5,624,032 A | * | 4/1997 | Yucknut et al. | ................ 206/433 |
| 5,697,707 A | | 12/1997 | Esposito | |
| 5,806,981 A | | 9/1998 | Schisler | |
| 5,850,911 A | | 12/1998 | Pakzad | |
| 6,241,084 B1 | * | 6/2001 | Gyr | ................................ 206/278 |
| 6,913,386 B2 | | 7/2005 | Maher et al. | |
| 2009/0223850 A1 | | 9/2009 | Katzauer et al. | |

* cited by examiner

*Primary Examiner* — Jeffrey Allen
(74) *Attorney, Agent, or Firm* — Griffiths & Seaton PLLC; JoAnn M. Seaton

(57) ABSTRACT

A meal package includes a reusable bag and first and second inserts arranged in the reusable bag to form compartments. The first insert has a first side edge and a second side edge and includes bottom and top portions bent out-of-plane from a side portion at first and second score lines. The second insert has a top edge and a bottom edge and includes two side portions bent out-of-plane from a middle portion at first and second score lines. The bottom portion of the first insert is located adjacent a bottom of the bag and the side portion of the first insert is located adjacent a first side of the bag. The bottom edge of the second insert abuts an interior surface of the bottom portion of the first insert. An interior surface of the top portion of the first insert abuts the top edge of the second insert.

21 Claims, 15 Drawing Sheets

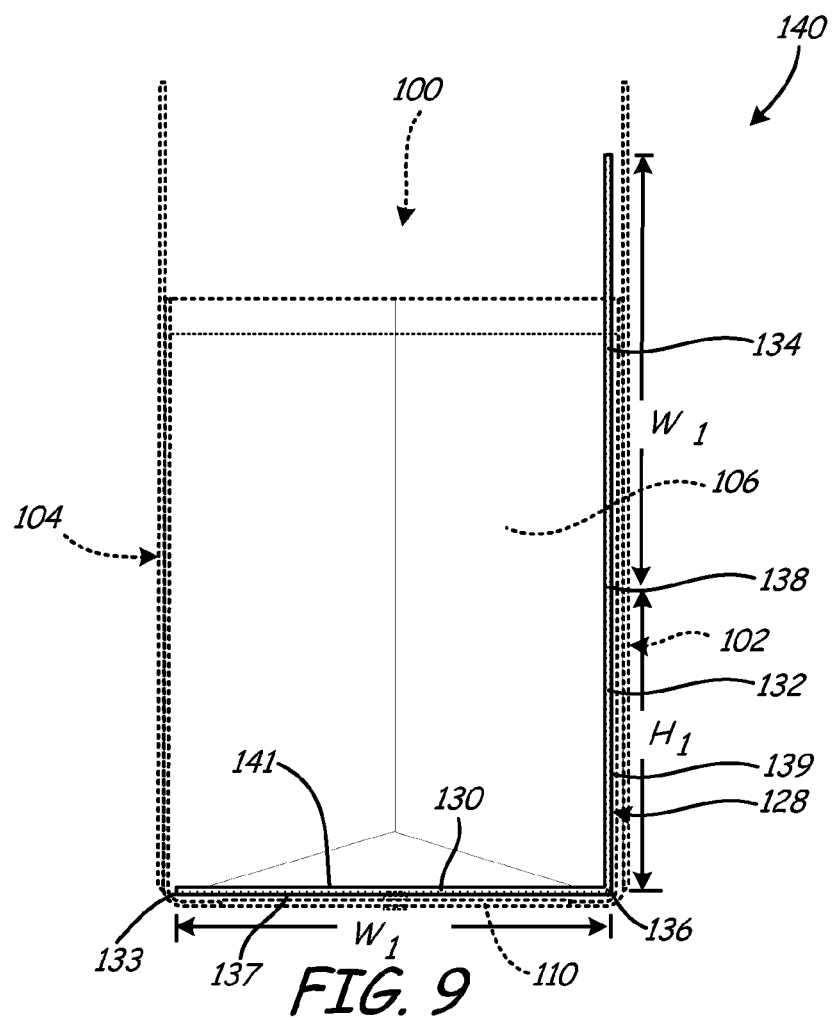
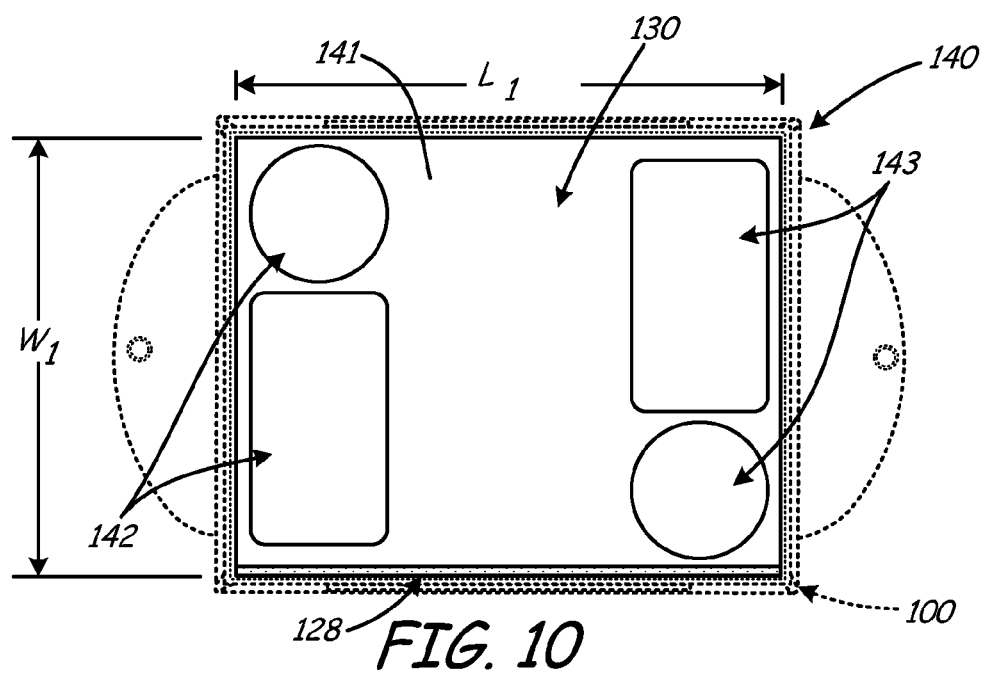

READY-MADE MEAL PACKAGE

BACKGROUND

The deli section of a grocery store can offer ready-made meals for pre-order. Often these types of meals are marketed for holidays, such as Thanksgiving, Christmas and the like. Ready-made meals provide the customer with an affordable meal requiring little further preparation that includes a variety of components, such as appetizers, a main course, side dishes and dessert.

Reusable shopping bags are considered a sustainable alternative to using single-use plastic or paper bags when carrying groceries or other purchased items away from a retail establishment. Reusable bags are made of a durable material and can be reused many times over a given period of time.

The discussion above is merely provided for general background information and is not intended to be used as an aid in determining the scope of the claimed subject matter.

SUMMARY

A meal package includes a reusable bag and first and second inserts arranged in the reusable bag to form compartments. The first insert has a first side edge and a second side edge that includes a bottom portion connected to a side portion by a first score line and a top portion connected to the side portion by a second score line. The second insert has a top edge and a bottom edge that includes a first side portion connected to a middle portion by a first score line and a second side portion connect to a middle portion by a second score line.

To assemble the meal package, the bottom portion of the first insert is bent out-of-plane from the side portion at the first score line and placed into the bag. The bottom portion of the first insert is located adjacent a bottom of the bag and the side portion of the first insert is located adjacent a first side of the bag. The two side portions of the second insert are bent out-of-plane from the middle portion at the first and second score lines and placed in the bag. The bottom edge of the second insert abuts an interior surface of the bottom portion of the first insert. The top portion of the second insert is then bent out-of-plane from the side portion at the second score line. An interior surface of the top portion is positioned to abut the top edge of the second insert.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 9 is a side view of a ready-made meal package in a partially assembled state including the first insert of FIG. 8 and the reusable bag of FIGS. 1-5 as shown in phantom.

FIG. 10 is top view of the ready-made meal package illustrated in FIG. 9.

DETAILED DESCRIPTION

Figure 1:
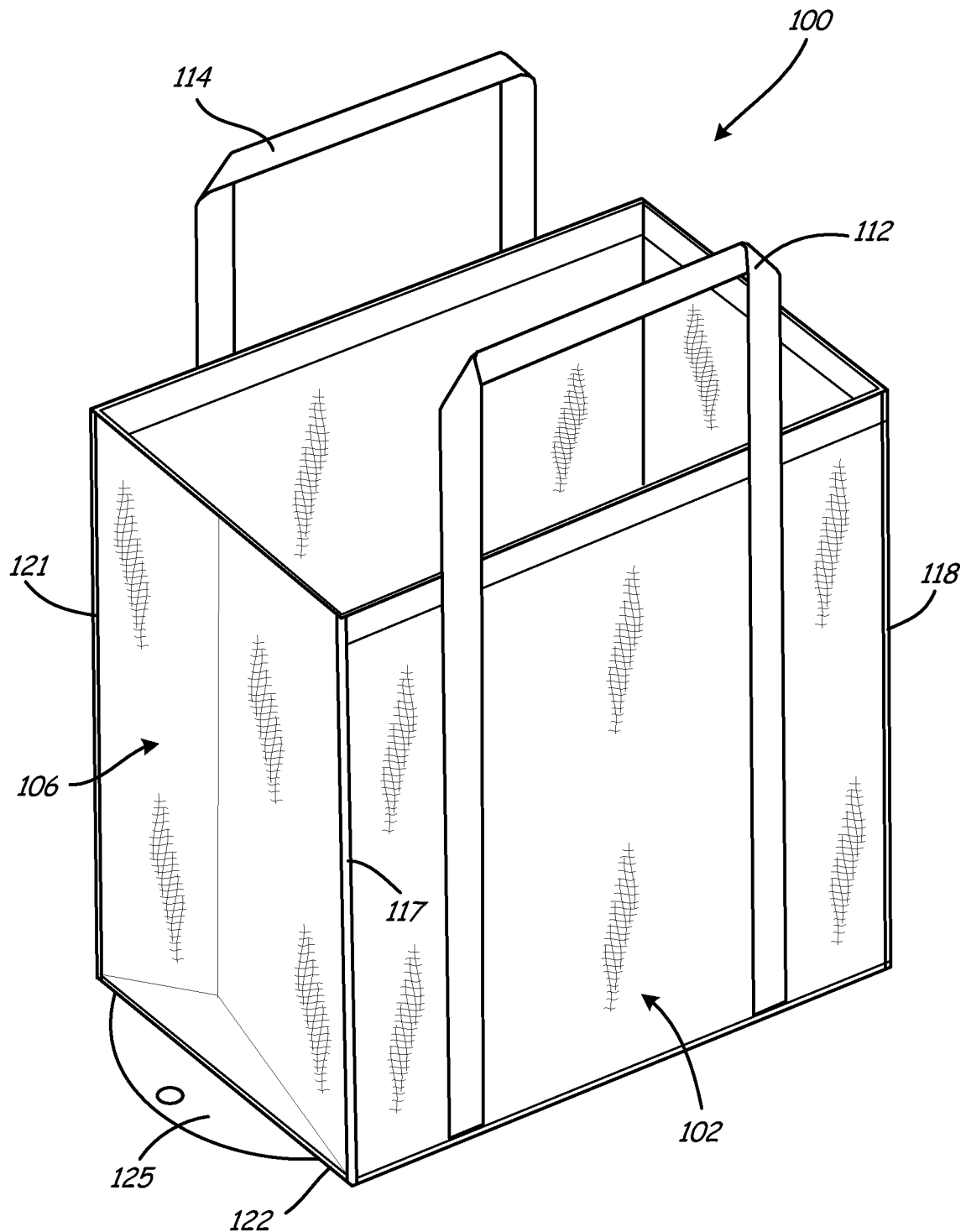
FIG. 1 is a perspective view of a reusable bag illustrated in a loadable state under one embodiment.
Figure 2:
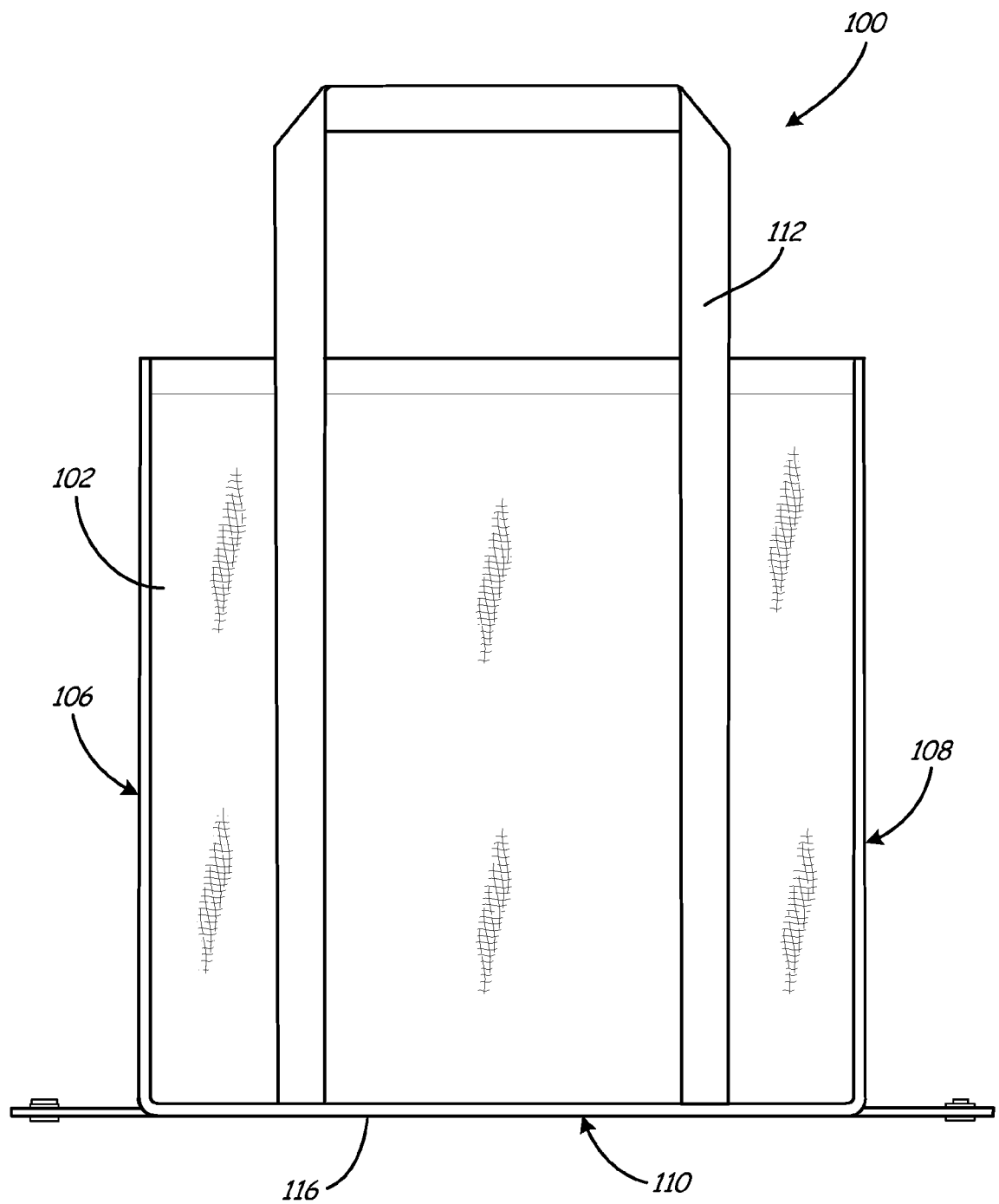
FIG. 2 is a front view of the reusable bag illustrated in FIG. 1.
Figure 3:
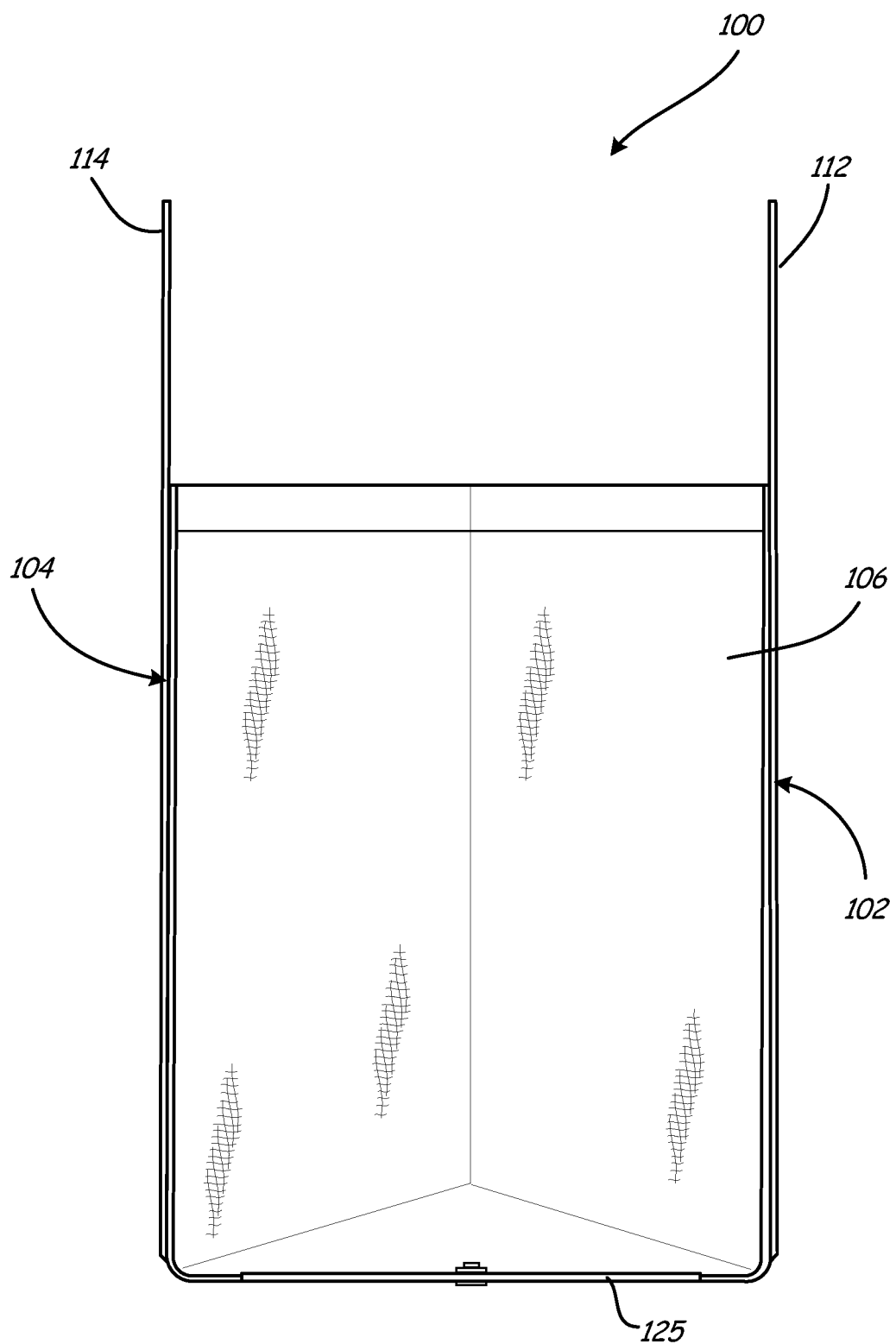
FIG. 3 is a right side view of the reusable bag illustrated in FIG. 1.
Figure 4:
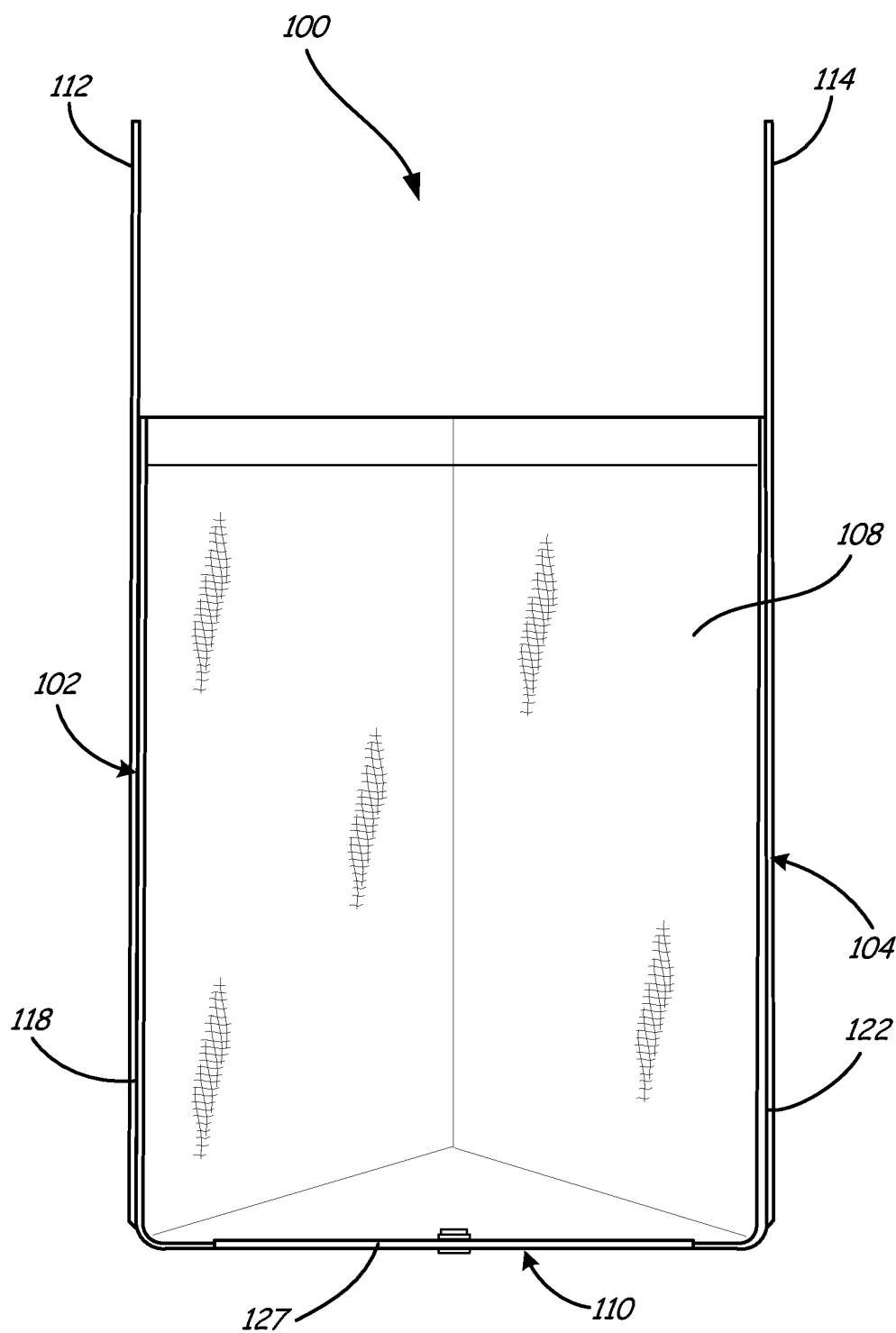
FIG. 4 is a left side view of the reusable bag illustrated in FIG. 1
Figure 5:
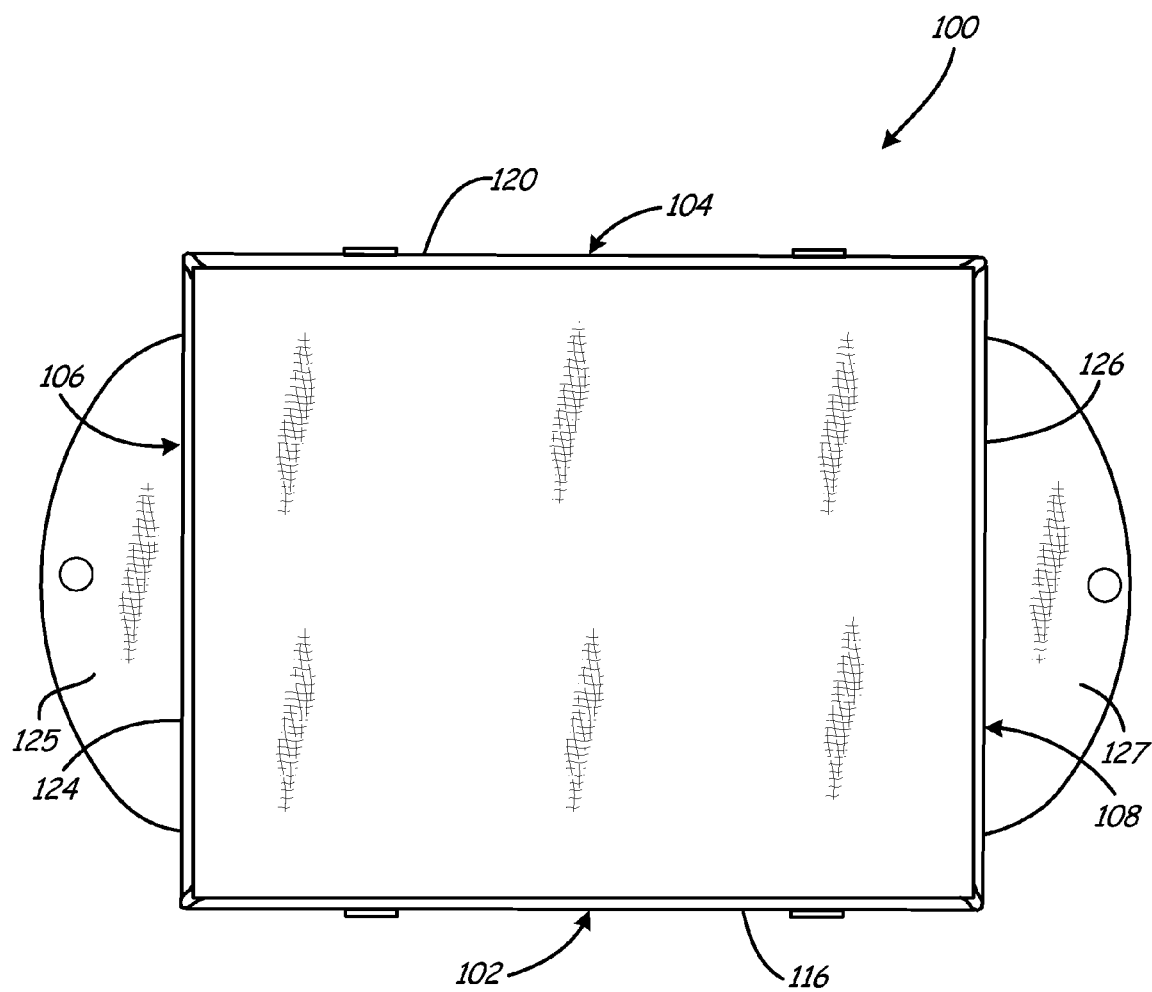
FIG. 5 is a bottom view of the reusable bag illustrated in FIG. 1.

Embodiments described herein include a ready-made meal package having features for containing components of a meal, features for being reusable and features for being collapsible when not in use. The ready-made meal package includes a reusable bag, a first insert and a second insert, which cooperate together to provide four compartments for the storage or carrying of the meal. Using the reusable bag and the first and second inserts to package a ready-made meal will prevent spillage of the food and allow the customer to reuse the bag for later shopping needs.

FIGS. 1-5 are perspective, front, right side, left side and bottom views, respectfully, of a reusable bag or tote 100 in a loadable state under one embodiment. Reusable bag 100 can be made of a fabric material, such as cotton, canvas, woven synthetic materials and the like, and includes a front 102, a back 104, a right side 106, a left side 108 and a bottom 110. Reusable bag 100 also includes a pair of handles 112 and 114. For added strength, front handle 112 is attached to an exterior surface of front panel 102 and back handle 114 is attached to an exterior surface of back panel 104.

Front 102 of bag 100 shares a common edge 116 with bottom 110. Back 104 of bag 100 shares a common edge 120 with bottom 110. Right side 106 of bag 100 shares a common edge 124 with bottom 110. Left side 108 of bag 100 shares a common edge 126 with bottom 110. Front 102 and right side 106 share a common edge 117, front 102 and left side 108 share a common edge 118, back 104 and right side 106 share a common edge 121 and back 104 and left side 108 share a common edge 122.

Figure 6:
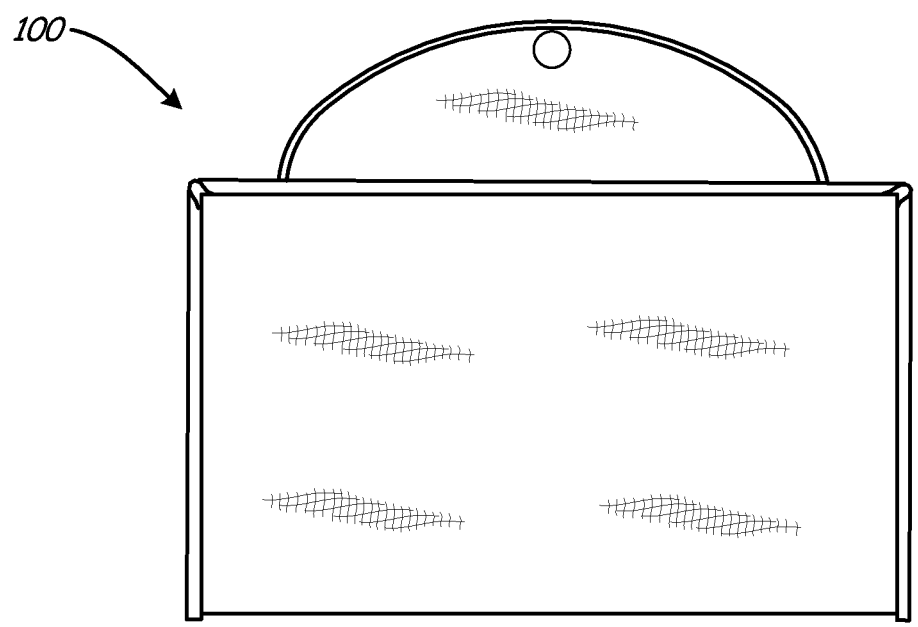
FIG. 6 illustrates the reusable bag illustrated in FIG. 1, but in a collapsed state under one embodiment.

Attached to edge 124 is a first flap 125 and attached to edge 126 is a second flap 127. Each flap 125 and 127 includes a male or female fastener such that first flap 125 and second flap 127 are held together by the fasteners when the bag is folded into a collapsed state as illustrated in FIG. 6.

Figure 7:
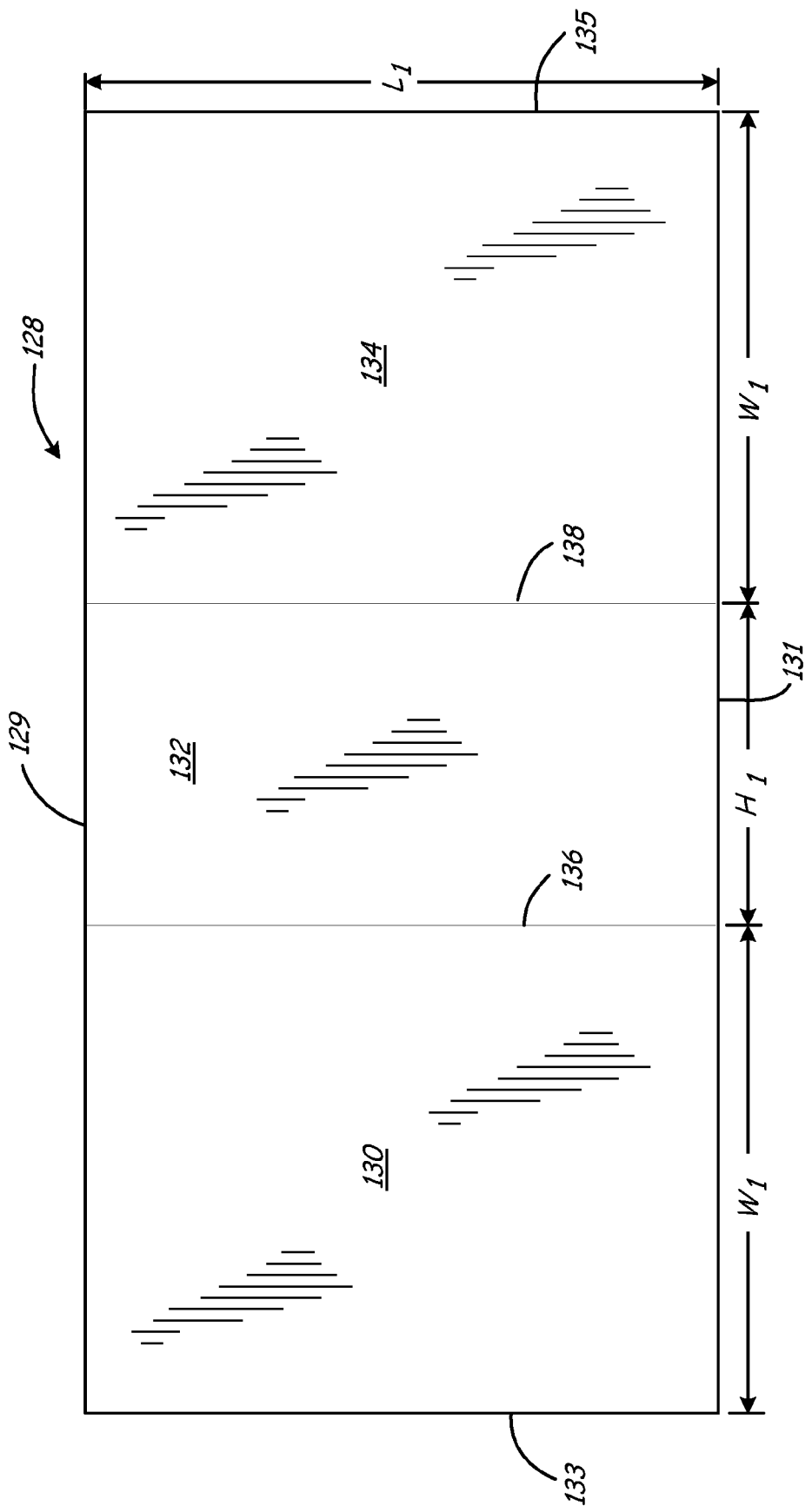
FIG. 7 is a plan view of a first insert for the reusable bag illustrated in FIGS. 1-5.

FIG. 7 is a plan view of a first insert or first partition 128 for reusable bag 100 illustrated in FIGS. 1-5. First insert 128 can be made of stiff sheet material, such as corrugated cardboard or other type of board material that has a thickness. For example, the sheet material can be a c-flute cardboard that is ¼ inch thick. First insert 128 includes bottom or first portion 130, side or second portion 132 and top or third portion 134. Bottom portion 130 is connected to side portion 132 by a first score line 136 and side portion 132 is connected to top portion 134 by a second score line 138. In other words, first and second score lines 136 and 138 of first insert 128 are in parallel and are spaced apart from each other by side portion 132.

Each of bottom, side and top portions 130, 132 and 134 have a shared first side edge 129 and a shared second side edge 131. First insert 128 also includes a bottom end edge 133 connecting the first side edge 129 to the second side edge 131 and a top end edge 135 connecting the first side edge 129 to the second side edge 131. Therefore, bottom portion 130 is defined by bottom end edge 133, first score line 136, first side edge 129 and second side edge 131, side portion 132 is defined by first score line 136, second score line 138, first side edge 129 and second side edge 131 and top portion 134 is defined by second score line 138, top end edge 135, first side edge 129 and second side edge 131.

Portions 130, 132 and 134 all have a first dimension of the same length $L_1$ that extends from first side edge 129 to second side edge 131. While bottom and top portions 130 and 134 also share the same second dimension of width $W_1$, side portion 132 has a different second dimension of height $H_1$. Width $W_1$ is the distance between the bottom end edge 133 and the first score line 136 and the distance between the top end edge 135 and the second score line 138. Height $H_1$ is the distance between the first score line 136 and the second score line 138. In one embodiment, the length $L_1$ is 17.75 inches, width $W_1$ is 13.75 inches and height $H_1$ is 9 inches. However, other dimensions are possible as long as the length $L_1$ is sized relative to the widths of front 102 and back 104 of the reusable bag, the width $W_1$ is sized relative to the widths of right side 106 and left side 108 of reusable bag 100 and the height $H_1$ is sized to be less than a height of reusable bag 100.

Figure 8:
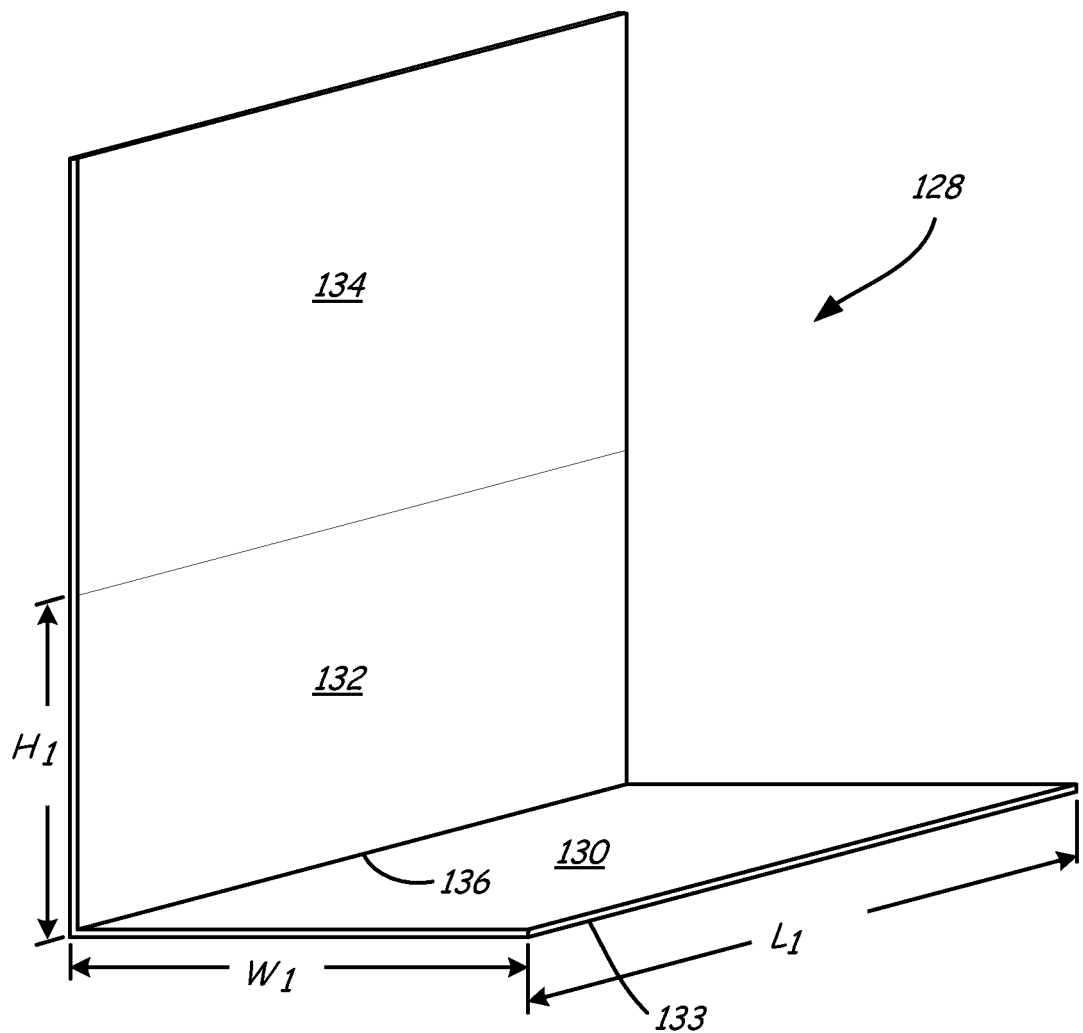
FIG. 8 is a perspective view of the first insert illustrated in FIG. 7.

FIG. 8 illustrates a perspective view of first insert or partition 128. In FIG. 8, bottom portion 130 is bent out-of-plane from side portion 132 at first score line 136 for insertion into bag or tote 100. FIG. 9 illustrates a side view of a ready-made meal package or container 140 in a partially assembled state including first insert or partition 128 and reusable bag or tote 100 shown in phantom. FIG. 10 is a top view of the ready-made meal package or container 140 illustrated in FIG. 9. To form the partially assembled package, first insert 128 is bent as illustrated in FIG. 8 such that bottom portion 130 is substantially at a right angle to side portion 132 and top portion 134.

In FIGS. 9 and 10, first insert 128 is inserted into reusable bag 100 such that an exterior surface 137 of bottom portion 130 fits adjacent to bottom 110, between front 102 and back 104 and between right side 106 and left side 108. Further, bottom end edge 133 of first insert 128 is positioned adjacent to back 104 of bag 100 and an exterior surface 139 of side portion 132 of first insert 128 fits adjacent to front 102 of bag 100. In other words, width $W_1$ of first insert 128 corresponds to a distance between the front 102 and the back 104 of the bag 100 and length $L_1$ of first insert 128 corresponds to a distance between the right side 106 and the left side 108 of bag 100.

However, it should be realized that in the alternative, bottom end edge 133 could be positioned adjacent front 102 and exterior surface 139 could be positioned adjacent to back 104. In FIG. 10, a first set of food containers 142 and a second set of food containers 143 are then loaded on an interior surface 141 of bottom portion 130 of first insert 128.

Figure 11:
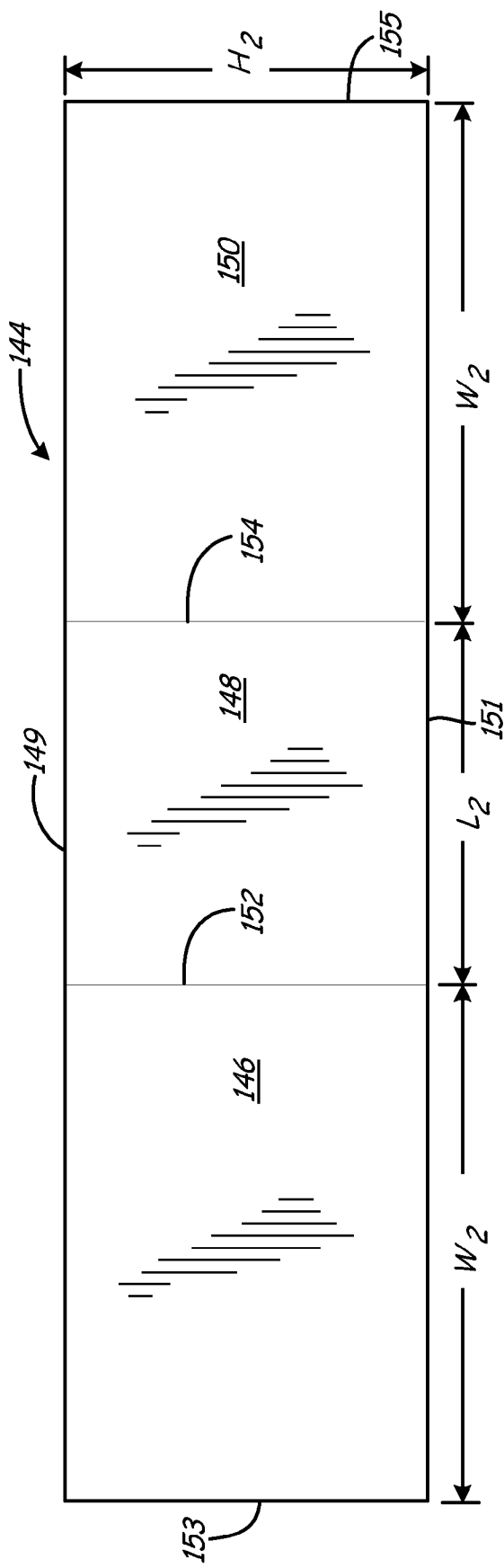
FIG. 11 is a plan view of a second insert for the reusable bag illustrated in FIGS. 1-5.

FIG. 11 is a plan view of a second insert or partition 144 for the reusable bag or tote illustrated in FIGS. 1-5. Like first insert 128, second insert 144 can be made of stiff sheet material, such as corrugated cardboard or other type of board material. Second insert 144 includes first, second and third portions 146, 148 and 150 of which portions 146 and 150 are side portions and portion 148 is a middle portion. Side portion 146 is connected to middle portion 148 by a first score line 152 and second portion 148 is connected to side portion 150 by a second score line 154. Therefore, first and second score lines 152 and 154 of second insert 144 are in parallel and spaced apart from each other by middle portion 148.

Each of side portions 146 and 150 and middle portion 148 of second insert 144 have a shared top edge 149 and a shared bottom edge 151. Second insert 144 also includes a first end edge 153 connecting the top edge 149 to the bottom edge 151 and a second end edge 155 connecting the top edge 149 to the bottom edge 151. Therefore, side portion 146 is defined by first end edge 153, first score line 152, top edge 149 and bottom edge 151, middle portion 148 is defined by first score line 152, second score line 154, top edge 149 and bottom edge 151 and side portion 150 is defined by second score line 154, second end edge 155, top edge 149 and bottom edge 151.

Under one embodiment, portions 146, 148 and 150 all have a first dimension of the same height $H_2$ that extends from top edge 153 to bottom edge 155. Under this embodiment, while portions 146 and 150 also share the same second dimension of width $W_2$, portion 148 has a different second dimension of length $L_2$. As such, height $H_2$ of second insert 144 is equal to height $H_1$ of portion 132 of first insert 128, while the widths $W_2$ of portions 146 and 150 of second insert 144 are less than the width $W_1$ of portions 130 and 134 of first insert 128. In the embodiment illustrated, the height $H_2$ of second insert 144, the height $H_1$ of portion 132 and the length $L_2$ of portion 148 have equivalent dimensions. For example, height $H_2$ is 9 inches, width $W_2$ is 12.75 inches and length $L_2$ is 9 inches. However, other dimensions are possible as long as height $H_2$ is sized relative to the height $H_1$ such that the height of second insert 144 can fit between first and second score lines 136 and 138 of first insert, the widths $W_2$ are sized relative to widths $W_1$ such that portions 146 and 150 of second insert 144 can fit between bottom end edge 133 and first score line 136 and between top end edge 135 and second score line 138, and length $L_2$ of second insert 144 is sized to be less than length $L_1$ of first insert 128.

Figure 12:
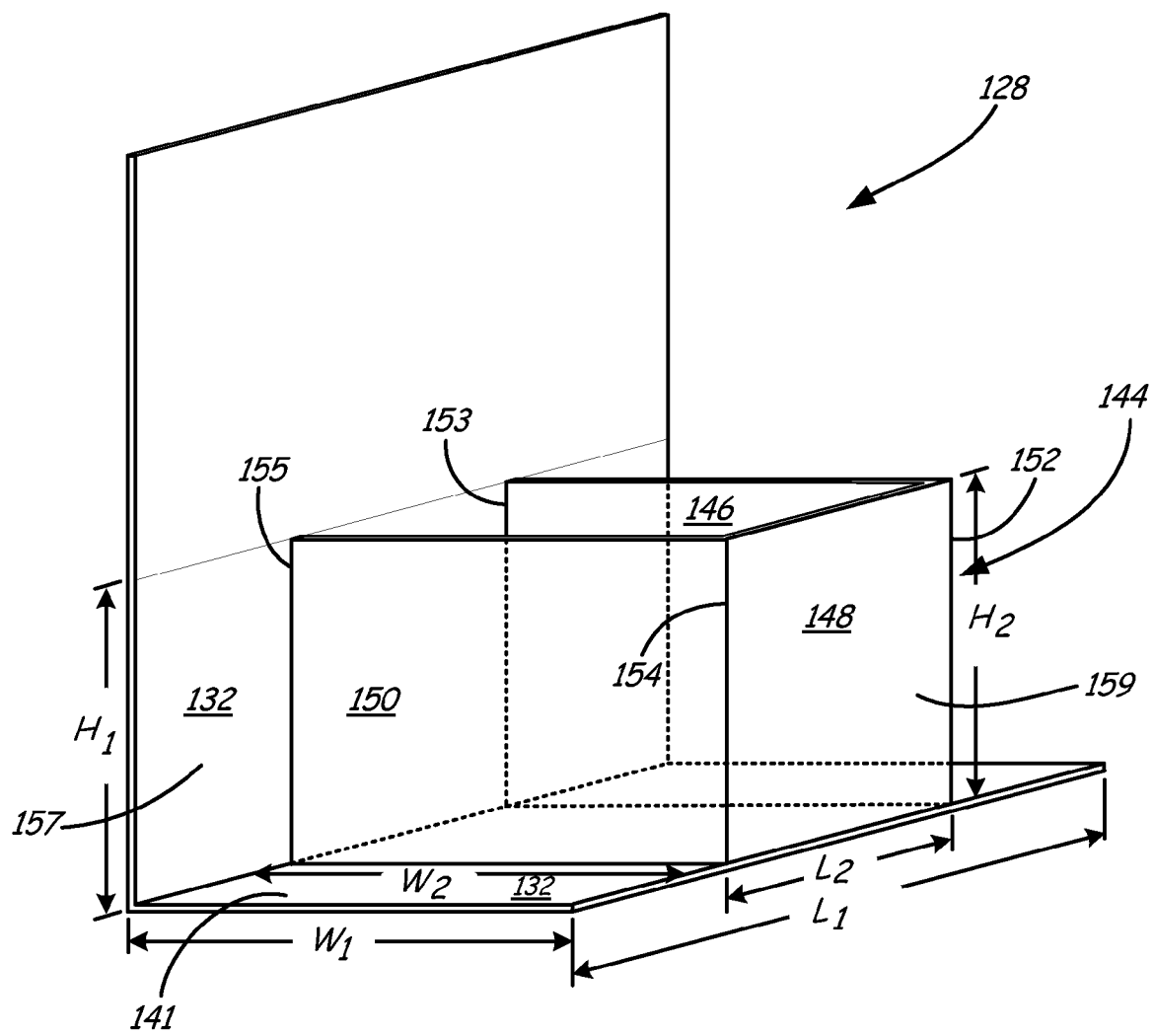
FIG. 12 is a perspective view of the first insert illustrated in FIG. 8 and the second insert illustrated in FIG. 11 as partially assembled together.
Figure 13:
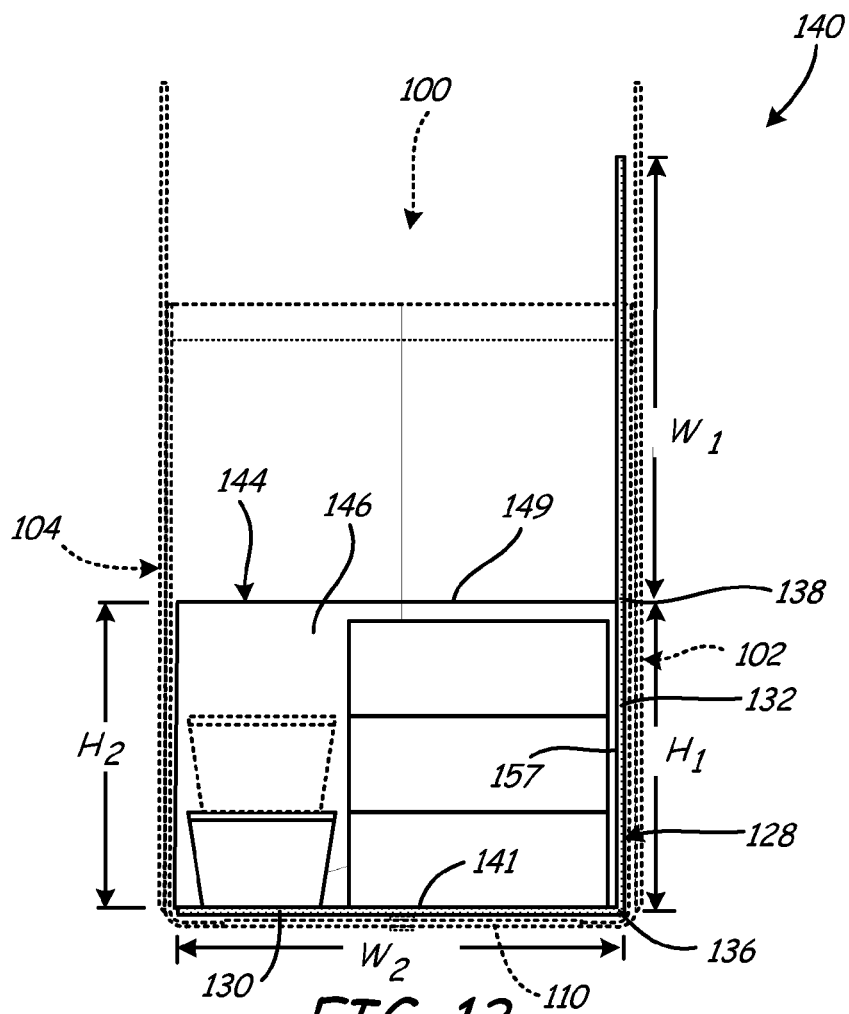
FIG. 13 is a side view of the ready-made meal package in a further partially assembled state including the first insert and the second insert illustrated in FIG. 12 and the reusable bag of FIGS. 1-5 shown in phantom.
Figure 14:
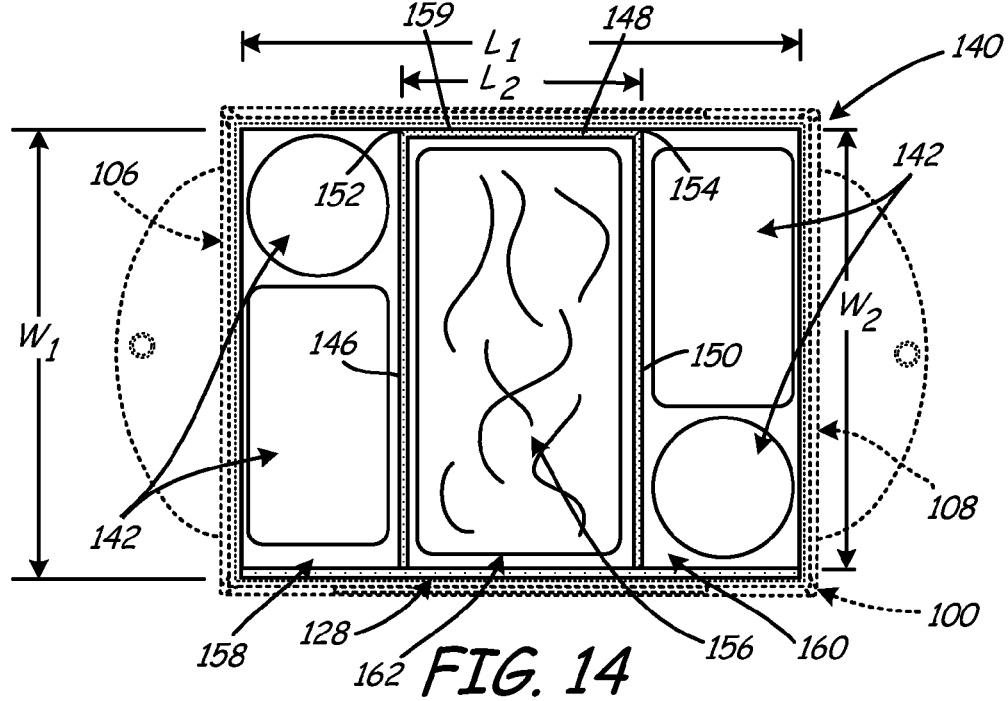
FIG. 14 is a top view of the ready-made meal package illustrated in FIG. 13.

FIG. 12 illustrates a perspective view of first insert or partition 128 and second insert or partition 144 as partially assembled together. In FIG. 12, side portion 146 of second insert 144 is bent out-of-plane from middle portion 148 along first score line 152 and side portion 150 of second insert 144 is bent out-of-plane from middle portion 148 along second score line 154 for insertion into bag or tote 100. FIG. 13 illustrates a side view of ready-made meal package or container 140 in a further partially assembled state including both first insert or partition 128 and second insert or partition 144. FIG. 14 is a top view of the ready-made meal package or container 140 illustrated in FIG. 13. To form the further partially assembled package, second insert 144 is bent as illustrated in FIG. 12 such that first portion 146 is substantially at a right angle to second portion 148, and third portion 150 is substantially at a right angle to second portion 148.

In FIGS. 13 and 14, second insert 144 is inserted into reusable bag 100 in a configuration that provides the shared bottom edge 151 (FIG. 11) of side portions 146 and 150 and middle portion 148 to abut interior surface 141 of bottom portion 130 that is located adjacent the bottom of bag 100. Side portions 146 and 150 are oriented such that their widths $W_2$ of fit between side portion 132 of first insert 128 and back 104 of bag 100. Middle portion 148 is oriented such that its length $L_2$ runs between first score line 152 and second score line 154, at a right angle to side portions 146 and 150 and for a distance that is less than a distance between right side 106 and left side 108 of bag 100. In addition, an exterior surface 159 of middle portion 148 is positioned adjacent back 104 of bag 100. Therefore, first end edge 153 and second end edge 155 of side portions 146 and 150 abut an interior surface 157 of second portion 132. In FIG. 14, a second set of food container(s) 156 have been loaded on interior surface 141 and between side portion 146 and side portion 150 of second insert 144.

Figure 15:
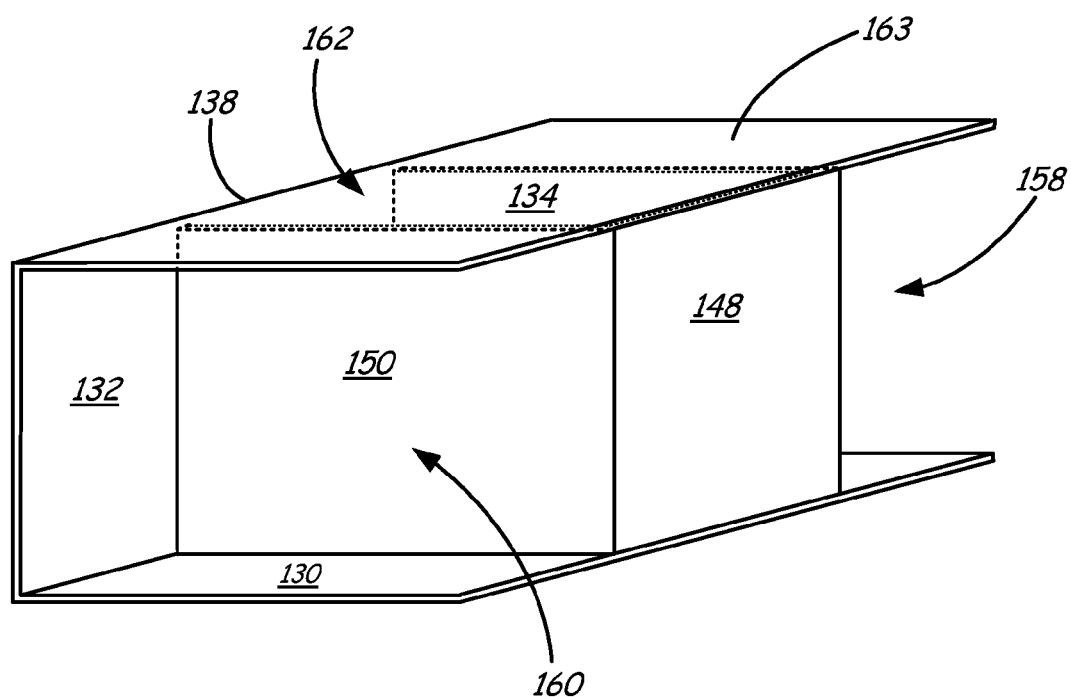
FIG. 15 is a perspective view of the first and the second inserts as assembled together.
Figure 16:
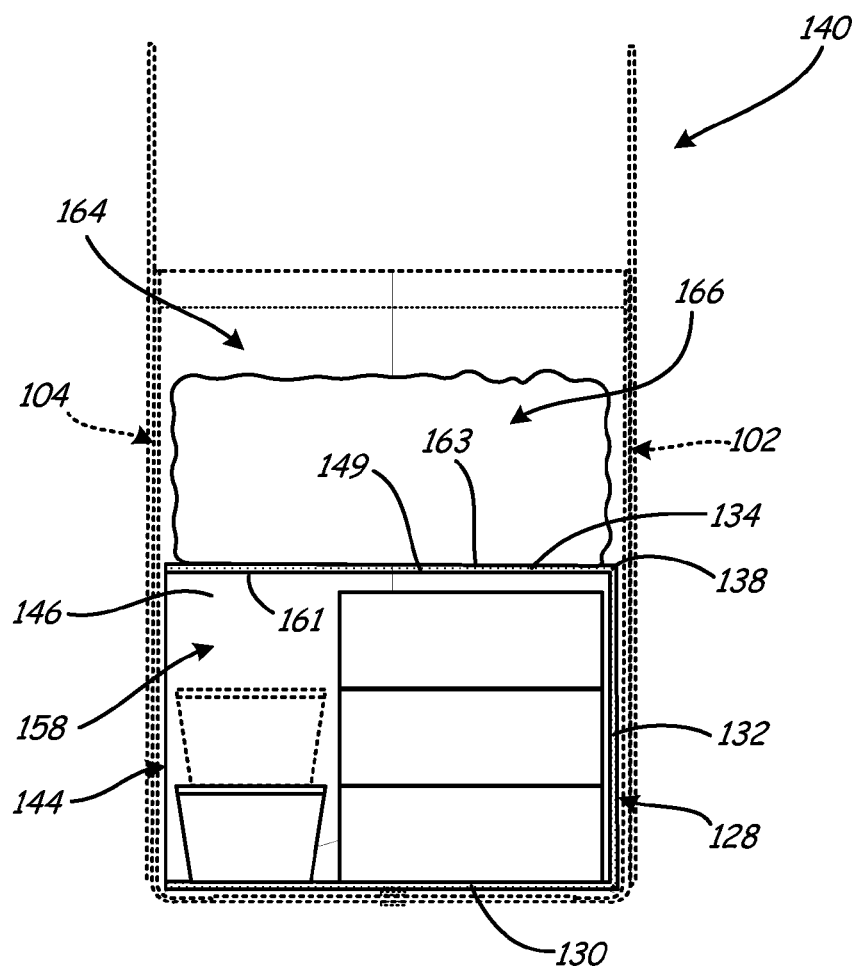
FIG. 16 is a side view of the ready-made meal package in an assembled state including the first and the second inserts illustrated in FIG. 15 and the reusable bag shown in phantom.
Figure 17:
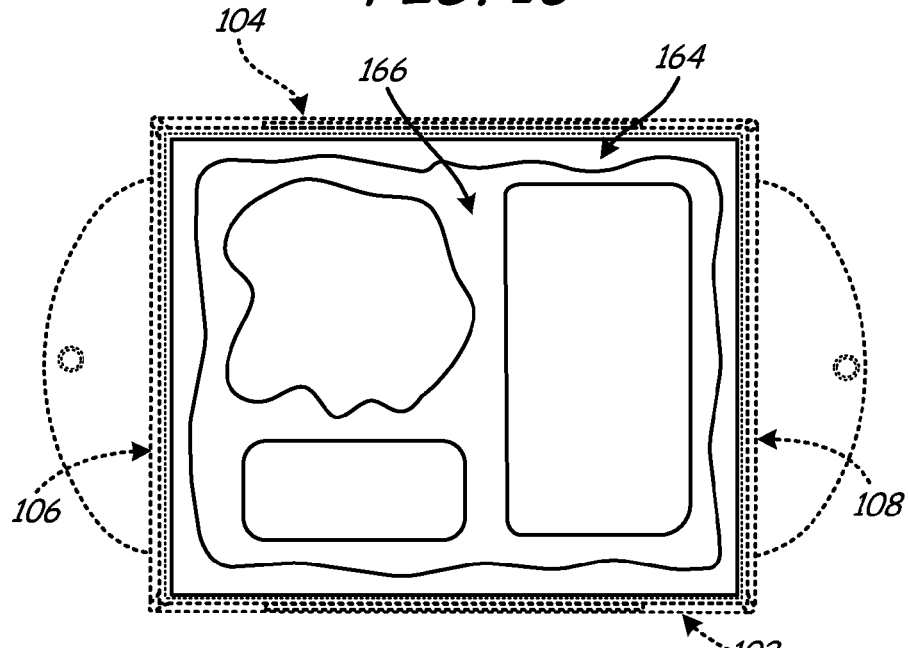
FIG. 17 is a top view of the ready-made meal package illustrated in FIG. 16.

FIG. 15 illustrates a perspective view of first insert or partition 128 and second insert or partition 144 as assembled together. In FIG. 15, top portion 134 of first insert 128 is bent out-of-plane from side portion 132 at second score line 138 while first and second inserts 128 and 144 are located in bag or tote 100. FIG. 16 illustrates a side view of ready-made meal package or container 140 in its assembled state including both first insert 128 and second insert 144 in their final configurations. FIG. 17 is a top view of ready-made meal package or container 140 illustrated in FIG. 16. To form the assembled package, first insert 128 is bent as illustrated in FIG. 15 such that top portion 134 is substantially at a right angle to side portion 132 so as to be substantially parallel to bottom portion 130. An interior surface 161 of top portion 134 abuts the shared top edge 149 of second insert 144.

Figure 18:
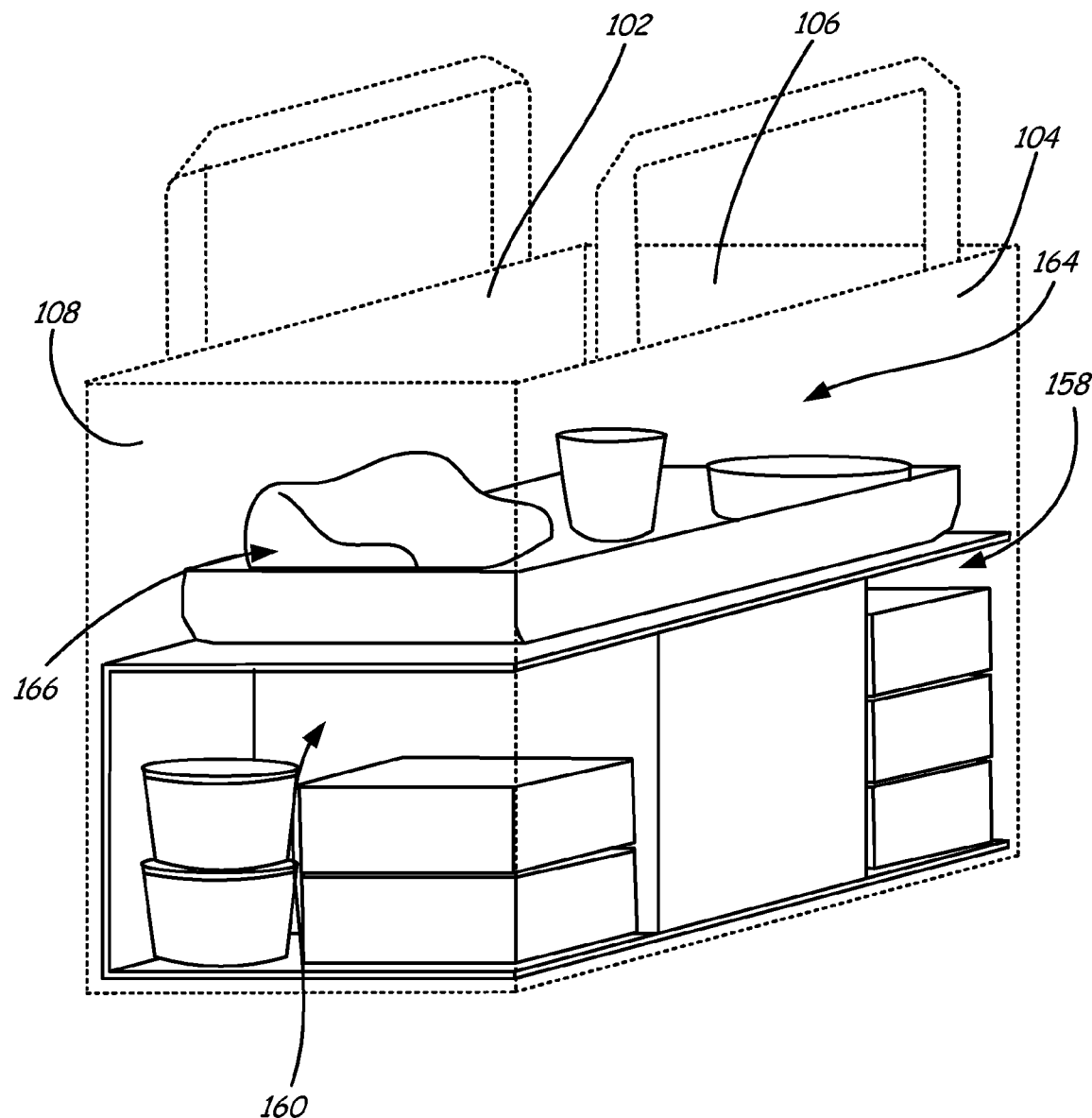
FIG. 18 is a perspective view of the ready-made meal package illustrated in FIG. 16.

As illustrated in the perspective view of FIG. 18, the final configurations of first insert 128 and second insert 144 provide ready-made meal package 140 with four different compartments. The first compartment 158 (also illustrated in FIGS. 14 and 15) is defined by side portion 132 of first insert 128, back 104 of bag 100, side portion 146 of second insert 144, right side 106 of bag 100, bottom portion 130 of first insert 128 and top portion 134 of first insert 128. The second compartment 160 (also illustrated in FIGS. 14 and 15) is defined by side portion 132 of first insert 128, back 104 of bag 100, side portion 150 of second insert 144, left side 108 of bag 100, bottom portion 130 of first insert 128 and top portion 134 of first insert 128. The third compartment 162 (also illustrated in FIGS. 14 and 15) is defined by side portion 132 of first insert 128, side portion 146 of second insert 144, middle portion 148 of second insert 144, side portion 150 of second insert 144, bottom portion 130 of insert 128 and top portion 134 of insert 128.

The fourth compartment 164 is illustrated in FIGS. 16, 17 and 18. In these figures, a third set of food container(s) 166 has been loaded into fourth compartment 164 or on an exterior surface 163 (also illustrated in FIG. 15) of third portion 134 in its final configuration. The fourth compartment 164 is defined by top portion 134 of first insert 128, front 102 of the bag, back 104 of the bag, right side 106 of the bag and left side 108 of the bag.

Under one embodiment, the ready-made meal package 140 can be assembled together into a particular arrangement of first and second inserts 128 and 144 in combination with certain dishes or food containers of the meal. First insert 128 can be bent such that bottom portion 130 is bent out-of-plane from side portion 132 at first score line 136. First insert 128 can be placed into reusable bag 100 by locating bottom portion 130 adjacent bottom 110 of reusable bag 100 and locating side portion 132 adjacent front side 102 of reusable bag 100. After placing first insert 128 into reusable bag 100, a first set of food containers 142 for holding side dishes of the meal are loaded onto interior surface 141 of bottom portion 130 of first insert 128. A second set of food containers 143 for holding additional side dishes of the meal are loaded onto interior surface 141 of bottom portion 130 of first insert 128. For example, containers of side dishes can include mashed potatoes, vegetables, stuffing, gravy, cranberry relish and the like.

Second insert 144 can be bent such that first and second side portions 136 and 150 are bent out-of-plane from middle portion 148 at first and second score lines 153 and 154. Second insert 144 can be placed into reusable bag 100 by abutting bottom edge 151 with interior surface 141 of bottom portion 130 of first insert 128 and placing second insert 144 between the first and second set of food containers. After placing second insert 144 into reusable bag 100, a third set of food container(s) for holding the main course of the meal can be loaded onto interior surface 141 of bottom portion 130 of first insert 128. For example, the main course can include ham, turkey, roast beef, prime rib and the like. First insert can be bent such that top portion 134, connected to side portion 132 at second score line 138, is bent out-of-plane from side portion 132 at second score line 134 and abuts top edge 149 of second insert 144.

After bending top portion 134 of first insert 144, a fourth set of food containers for holding additional components of the meal can be loaded onto exterior surface 163 of top portion 134. For example, additional components can include a pan for cooking the main course, rolls, dessert, coffee and the like. Therefore, side dishes are packed into first compartment 158 and second compartment 160, the main course is packed into third compartment 162 and additional components of the meal are packed into fourth compartment 164.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A meal package comprising:
   a reusable bag defined by first, second, third and fourth sides and a bottom;
   a first insert formed separately from the reusable bag and having a bottom portion and a top portion bent out-of-plane from a side portion of the first insert at first and second score lines of the first insert, each of the bottom, top and side portions having a shared first side edge and a shared second side edge;
   a second insert formed as a single piece separate from the first insert and the reusable bag and having a first side portion and a second side portion bent out-of-plane from a middle portion of the second insert at first and second score lines of the second insert, each of the first and second side portions and the middle portion having a shared top edge and a shared bottom edge;
   wherein the bent first and second inserts form a plurality of separate compartments by being arranged such that:
      the bottom portion of the first insert is positioned adjacent the bottom of the reusable bag,
      the side portion of the first insert is positioned adjacent the first side of the reusable bag, the shared bottom edge of the second insert abuts an interior surface of the bottom portion of the first insert, the middle portion of the second insert abuts the second side of the reusable bag, the second side of the reusable bag being opposite the first side, an interior surface of the top portion of the first insert abuts the shared top edge of the second insert, and the plurality of separate compartments includes a first compartment defined by and enclosed between the bottom portion of the first insert, the top portion of the first insert, the side portion of the first insert, the middle portion of the second insert, the first side portion of the second insert, and the second side portion of the second insert.

2. The meal package of claim 1, wherein: the side portion of the first insert includes an external surface that faces and abuts the first side of the reusable bag, the first insert comprises a free bottom end edge that along with the first score line of the first insert, the shared first side edge and the shared second side edge defines the bottom portion, and a free top end edge that along with the second score line of the first insert, the shared first side edge and the shared second side edge defines the top portion, and the free bottom end edge and the free top end edge abut the second side of the reusable bag opposite the first side.

3. The meal package of claim 2, wherein the first insert comprises:
a width dimension defined between the free bottom end edge and the first score line of the first insert and between the free top end edge and the second score line of the first insert, the width dimension corresponding to a distance between the first side of the reusable bag and the second side of the reusable bag;
a height dimension defined between the first score line and the second score line, the height dimension corresponding to a distance that is less than an interior height of the reusable bag; and
a length dimension defined between the shared first side edge and the shared second side edge, the length dimension corresponding to a distance between the third side of the reusable bag and the fourth side of the reusable bag opposite the third side.

4. The meal package of claim 3, wherein the second insert comprises a first free end edge that along with the first score line of the second insert, the shared top edge and the shared bottom edge defines the first side portion, and a second free end edge that along with the second score line of the second insert, the shared top edge and the shared bottom edge defines the second side portion, and the first free end edge and the second free end edge abut an interior surface of the side portion of the first insert that is positioned adjacent to the first side of the reusable bag.

5. The meal package of claim 4, wherein the second insert comprises:
a width dimension defined between the first free end edge and the first score line of the second insert and between the second free end edge and the second score line of the second insert, the width dimension corresponding to a distance between the second side of the reusable bag and the interior surface of the side portion of the first insert when positioned adjacent to the first side of the reusable bag;
a height dimension defined between the shared bottom edge and the shared top edge, the height dimension corresponding to a distance between the interior surface of the bottom portion of the first insert and the interior surface of the top portion of the first insert; and
a length dimension defined between the first score line and the second score line of the second insert, the length dimension corresponding to a distance that is less than a distance between the third side and the fourth side of the reusable bag.

6. The meal package of claim 5, wherein the height dimension of the second insert is substantially equal to the height dimension of the first insert.

7. The meal package of claim 1, wherein the plurality of separate compartments includes a second compartment defined by and enclosed between the bottom portion of the first insert, the top portion of the first insert, the side portion of the first insert, the second side of the reusable bag opposite the first side of the reusable bag, the first side portion of the second insert, and the third side of the reusable bag.

8. The meal package of claim 7, wherein the plurality of separate compartments includes a third compartment defined by and enclosed between the bottom portion of the first insert, the top portion of the first insert, the side portion of the first insert, the second side of the reusable bag, the second side portion of the second insert, and the fourth side of the reusable bag opposite the third side.

9. The meal package of claim 8, wherein the plurality of separate compartments includes a fourth compartment defined by the top portion of the first insert, the first side of the reusable bag, the second side of the reusable bag, the third side of the reusable bag and the fourth side of the reusable bag, the fourth compartment is adjacent an exterior surface of the top portion of the first insert, and the top portion of the first insert is substantially continuous such that the fourth compartment is entirely separated from each of the first compartment, the second compartment, and the third compartment.

10. A container for transporting a meal comprising:
a tote defined by a front, a back, a bottom and first and second opposing sides;
a first partition having first and third portions bent out-of-plane from a second portion at first and second score lines, each of the first, second and third portions having a shared first side edge and a shared second side edge, the first portion including a free bottom end edge connecting the shared first and shared second side edges and the third portion including a free top end edge connecting the shared first and shared second side edges; and
a second partition having first and third portions bent out-of-plane from a second portion at first and second score lines, each of the first, second and third portions of the second partition having a shared top edge and a shared bottom edge, the first portion of the second partition including a free first end edge connecting the shared top and the shared bottom edges and the third portion including a free second end edge connecting the shared top and the shared bottom edges;
wherein the bent first and second partitions are arranged in the tote to form an arrangement having a plurality of separate compartments, the arrangement defined by:
the first portion of the first partition defining a first exterior surface facing and abutting the bottom of the tote, wherein the free bottom end edge abuts the back of the tote;
the second portion of the first partition defining a second exterior surface facing and abutting the front of the tote;
the shared bottom edge of the second partition abutting the first portion of the first partition;

the second portion of the second partition defining a third exterior surface facing and abutting the back of the tote, wherein the free first end edge and the free second end edge of the second partition abut the second portion of the first partition; and the third portion of the first partition abutting the shared top edge of the second partition with the shared top end edge located adjacent the back of the tote.

11. The meal package of claim 1, wherein the reusable bag defines an open top opposite the bottom.

12. The meal package of claim 1, wherein the bottom portion of the first insert directly abuts the bottom of the reusable bag, and the side portion of the first insert directly abuts the first side of the reusable bag.

13. The meal package of claim 1, wherein:
the bottom portion of the first insert defines a bottom portion external surface extending from the shared first side edge to the shared second side edge and facing and abutting the bottom of the reusable bag,
the side portion of the first insert defines a side portion external surface extending from the shared first side edge to the shared second side edge and facing and abutting the first side of the reusable bag, and
the middle portion of the second insert defines a middle portion external surface extending from the shared top edge to the shared bottom edge and facing and abutting the second side of the reusable bag.

14. The meal package of claim 13, wherein:
the second insert defines a free first end edge adjacent the first side portion opposite the middle portion and a free second end edge adjacent the second side portion and opposite the middle portion;
the free first end edge and the free second end edge both face and abut an interior surface of the side portion of the first insert, and
the interior surface of the side portion is opposite the side portion external surface.

15. The meal package of claim 14, wherein:
a total of three entirely separate compartments are formed between the side portion of the first insert and the second side of the reusable bag and between the third side of the reusable bag and the fourth side of the reusable bag,
the third side of the reusable bag extends between the first side and the second side of the reusable bag, and
the fourth side of the reusable bag is positioned opposite the third side of the reusable bag and extends between the first side and the second side of the reusable bag.

16. The container of claim 10, wherein:
the first exterior surface extends from the shared first side edge to the shared second side edge,
the second exterior surface extends from the shared first side edge to the shared second side edge, and
the third exterior surface extends from the shared top edge to the shared bottom edge.

17. The container of claim 16, wherein the plurality of separate compartments includes a first compartment enclosed between the first and third portions of the first partition and the first and third portions of the second partition.

18. The container of claim 10, wherein the plurality of separate compartments includes a first compartment enclosed between the first, second, and third portions of the first partition and the first, second, and third portions of the second partition.

19. The container of claim 18, wherein:
the plurality of separate compartments includes a second compartment and a third compartment,
the second compartment is enclosed between the first, second, and third portions of the first partition, the first portion of the second partition, and the first opposing side of the tote, and
the third compartment is enclosed between the first, second, and third portions of the first partition, the third portion of the second partition, and the second opposing side of the tote.

20. The container of claim 19, wherein:
the plurality of separate compartments includes a fourth compartment defined immediately above the third portion of the first partition opposite the first compartment, and
the third portion of the first partition is continuous between the first score line of the first partition and the free second end edge to maintain the fourth compartment entirely blocked from each of the first compartment, the second compartment, and the third compartment.

21. The container of claim 20, wherein the fourth compartment extends from the front to the back of the tote and from the first opposing side to the second opposing side of the tote.

* * * * *